(12) United States Patent
Orlov et al.

(10) Patent No.: US 6,945,668 B1
(45) Date of Patent: Sep. 20, 2005

(54) MULTIDIRECTIONAL TRANSPARENT PANEL LIGHTING SYSTEM

(75) Inventors: Arkady Orlov, Brooklyn, NY (US); Richard Erik Feus, Hampstead, NC (US)

(73) Assignee: Linear Lighting Corp., Long Island City, NY (US)

( * ) Notice: Subject to any disclaimer, the term of this patent is extended or adjusted under 35 U.S.C. 154(b) by 0 days.

(21) Appl. No.: 10/317,292

(22) Filed: Dec. 13, 2002

(51) Int. Cl.$^7$ ................................. F21S 4/00
(52) U.S. Cl. ............ 362/225; 362/576; 362/581; 362/633; 362/147; 362/185; 362/222; 362/223; 362/240; 362/244; 362/249; 362/311; 362/370; 362/408
(58) Field of Search ................. 362/225, 576, 362/581, 145, 147, 148, 184, 185, 222, 223, 362/227, 240, 244, 246, 249, 311, 330, 368, 362/370, 404, 408, 632, 633, 634

(56) References Cited

U.S. PATENT DOCUMENTS

| | | | | |
|---|---|---|---|---|
| 2,345,235 A | * | 3/1944 | Carter, Jr. | 362/140 |
| 3,681,591 A | * | 8/1972 | Loch | 362/217 |
| 5,134,549 A | * | 7/1992 | Yokoyama | 362/31 |
| 5,188,449 A | * | 2/1993 | Davis et al. | 362/148 |
| 5,390,436 A | | 2/1995 | Ashall | |
| 5,408,387 A | | 4/1995 | Murase | |
| 5,410,454 A | | 4/1995 | Murase | |
| 5,625,968 A | | 5/1997 | Ashall | |
| 5,649,754 A | | 7/1997 | Matsumoto | |
| 6,036,329 A | | 3/2000 | Iimura | |
| 6,161,939 A | | 12/2000 | Bansbach | |
| 6,174,065 B1 | | 1/2001 | Schurch | |
| 6,210,013 B1 | | 4/2001 | Bousfield | |
| 6,217,186 B1 | | 4/2001 | Fisher | |
| 6,275,339 B1 | | 8/2001 | Chazallet | |
| 6,296,372 B1 | | 10/2001 | Rhomberg | |
| 6,345,899 B1 | | 2/2002 | Ohkawa | |
| 2002/0181229 A1 | * | 12/2002 | Wei | 362/147 |

* cited by examiner

Primary Examiner—Sandra O'Shea
Assistant Examiner—Sharon Payne
(74) Attorney, Agent, or Firm—Seth Natter; Natter & Natter

(57) ABSTRACT

A multidirectional interior illumination lighting assembly is configured for mounting beneath a ceiling. The assembly includes a generally transparent planar acrylic panel and a hollow stringer which retains a panel edge and supports the panel in a horizontal position. The stringer carries a linear illumination source in registration with the panel edge. Additional stringers may be employed if additional edges of the panel are to be illuminated. To increase the direct and indirect illumination emanating from the panel, arrays of dots may be provided on the upper and lower faces of the panel.

20 Claims, 4 Drawing Sheets

MULTIDIRECTIONAL TRANSPARENT PANEL LIGHTING SYSTEM

BACKGROUND OF THE INVENTION

1. Field of the Invention

This invention relates generally to multidirectional interior lighting and more particularly to a fixture which projects illumination in opposite directions from opposed faces of a horizontal edge lit panel.

2. Antecedents of the Invention

The attributes of indirect lighting have long been recognized and include even distribution of illumination, reduction of distracting shadows, reduction of glare and the overall promotion of a stress free work or leisure environment. Augmentation with direct illumination was necessary, however, in many instances. Diffusion of the supplemental direct illumination remained as an objective to reduce undesirable effects.

There was a need, therefore, to provide a lighting fixture which could combine the attributes of indirect up light illumination, with diffused down light illumination and which would be relatively low in cost, aesthetically compatible with a wide range of room decor and prove economical in operation.

SUMMARY OF THE INVENTION

The present invention comprises a multidirectional lighting assembly which includes a housing supporting an edge lid transparent acrylic panel in a horizontal position beneath an interior ceiling surface. At least one panel edge is retained in a hollow extruded stringer of the housing. A linear illumination source is carried in the stringer in registration with the retained panel edge. The opposed faces of the panel may have arrays of dots applied, as by silk screening, to increase the illumination emanating therefrom.

The housing may comprise a plurality of stringers unitarily joined to one another at common ends. In an alternate configuration, one panel edge is retained in a hollow stringer and the opposite panel edge is retained in an extruded lintel, with the ends of the lintel and the stringer being joined by parallel end plates to form a rigid housing.

From the foregoing compendium, it will be appreciated that it is an aspect of the present invention to provide a multidirectional interior illumination lighting assembly of the general character described which is not subject to the disadvantages of the antecedents of the invention aforementioned.

A feature of the present invention is to provide a multidirectional interior illumination lighting assembly of the general character described which is relatively low in cost.

A consideration of the present invention is to provide a multidirectional interior illumination lighting assembly of the general character described which is energy efficient and economical in operation.

Another aspect of the present invention is to provide a multidirectional interior illumination lighting assembly of the general character described which is well suited for employment in a variety of environments.

Another feature of the present invention is to provide a multidirectional interior lighting assembly of the general character described wherein a housing includes a hollow stringer which supports a transparent panel in a horizontal plane and which carries a linear illumination source in registration with an edge of the panel.

A further consideration of the present invention is to provide a multidirectional interior lighting assembly of the general character described wherein illumination emanates in both upward and downward directions from opposed faces of a horizontal edge lit panel.

A still further aspect of the present invention is to provide a multidirectional interior lighting assembly of the general character described which is well suited for economical mass production fabrication utilizing extruded components.

To provide a multidirectional interior lighting assembly of the general character described which is configured for utilization of high efficiency linear illumination sources is a still further aspect of the present invention.

Other aspects, features and considerations of the present invention in part will be obvious and in part will be pointed out hereinafter.

With these ends in view, the invention finds embodiment in certain combinations of elements, arrangements of parts and series of steps by which the aforesaid aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which are shown some of the various exemplary embodiments of the invention.

DESCRIPTION OF THE PREFERRED EMBODIMENTS

Figure 1:
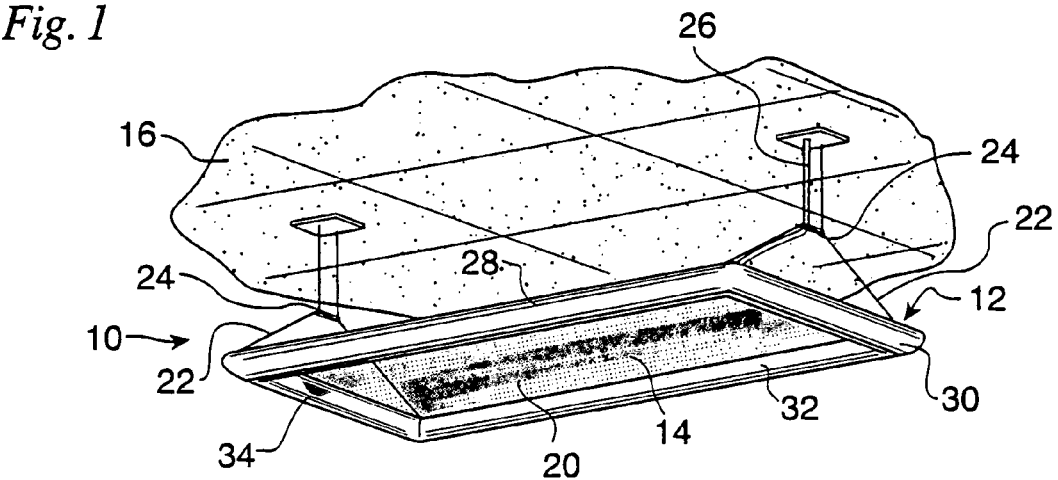
FIG. 1 is a perspective illustration of a typical multidirectional lighting assembly constructed in accordance with and embodying the invention with the assembly suspended from a ceiling and projecting illumination from opposed faces of a substantially transparent horizontal panel.

Referring now in detail to the drawings, the reference numeral 10 denotes generally a multidirectional interior lighting assembly constructed in accordance with and embodying the invention. The lighting assembly 10 includes a housing 12 which supports a lighting panel 14 in a generally horizontal position beneath a room ceiling 16 and above the elevation of occupants of the room.

The lighting panel 14 may comprise a transparent acrylic panel having planar opposed upper and lower faces 18, 20. In a manner well known, arrays of dots may be applied to the faces 18, 20 for increased illumination.

The assembly 10 may be suitably suspended from the ceiling 16 in a conventional manner as by a pair of suspension cables 22 at each end of the housing 12. For aesthetic appeal, the pairs of cables 22 may be threaded through a collar or sleeve 24. A suitable electrical lead 26 extends from a ceiling electrical box to the housing 12, as illustrated in FIG. 1.

Pursuant to the invention, the housing 12 is formed of a plurality of extruded hollow metal stringers 28, 30, 32 and 34. At intersecting corners, the stringers are butted together and may be seamlessly welded so as to provide a rigid housing having a smooth uniform appearance.

Figure 3:
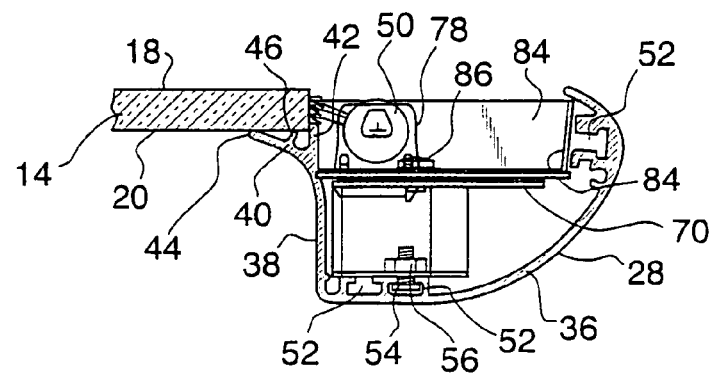
FIG. 3 is a fragmentary enlarged scale transverse sectional view through the lighting assembly, with portions deleted for clarity, the same being taken substantially along the plane 3—3 of FIG. 2.

As best illustrated in FIG. 3, the stringers are formed with a generally convex wall 36, facing outwardly from the lighting panel 14. Each stringer extends vertically upwardly from beneath the lighting panel 14 at a planar wall section 38. The planar wall section 38 terminates at a concave arch 40.

The interior surface of the stringer includes a vertical flange 42 which extends parallel to the planar section 38 to a level above the lower face 20 of the lighting panel 14. The flange 42 includes a L-shaped groove within which the peripheral surface of the lower face 20 of the lighting panel 14 is seated. The concave arch 40 includes, on its inner face, two support ribs 44, 46 upon which the lower face 20 of the lighting panel 14 rests.

Flush abutting contact between the lower face 20 and the L-shaped groove as well as between the lower face 20 the support ribs 44, 46, assures firm support for the lighting panel 14 and also precludes light leakage from a linear lighting source carried in the stringer. As a result, all illumination from the lighting source is either dispersed downwardly from the lower face 20 of the lighting panel 14 or is indirectly reflected from the ceiling 16.

In accordance with the invention, the extruded hollow stringers 28, 30, 32 and 34 carry linear lighting tubes 50 positioned in registration with the retained edges of the lighting panel 14 for direct unobstructed impingement of illumination from the tubes 50 against the edge of the lighting panel 14. The stringers additionally house electrical wiring, ballasts, reflectors, mounting hardware and other components as will be pointed out hereinafter.

With reference to FIG. 3, it will be noted that the interior of each stringer includes a plurality of mounting channels 52. The channels 52 are configured to slidably position and nonrotatably receive the heads of machine screws or bolts 54, which are positioned along the length of each stringer. Each of the bolts 54 accommodates a mating nut 56 such that mounting and other hardware as well as ballasts carried in the stringer can be secured.

Figure 4:
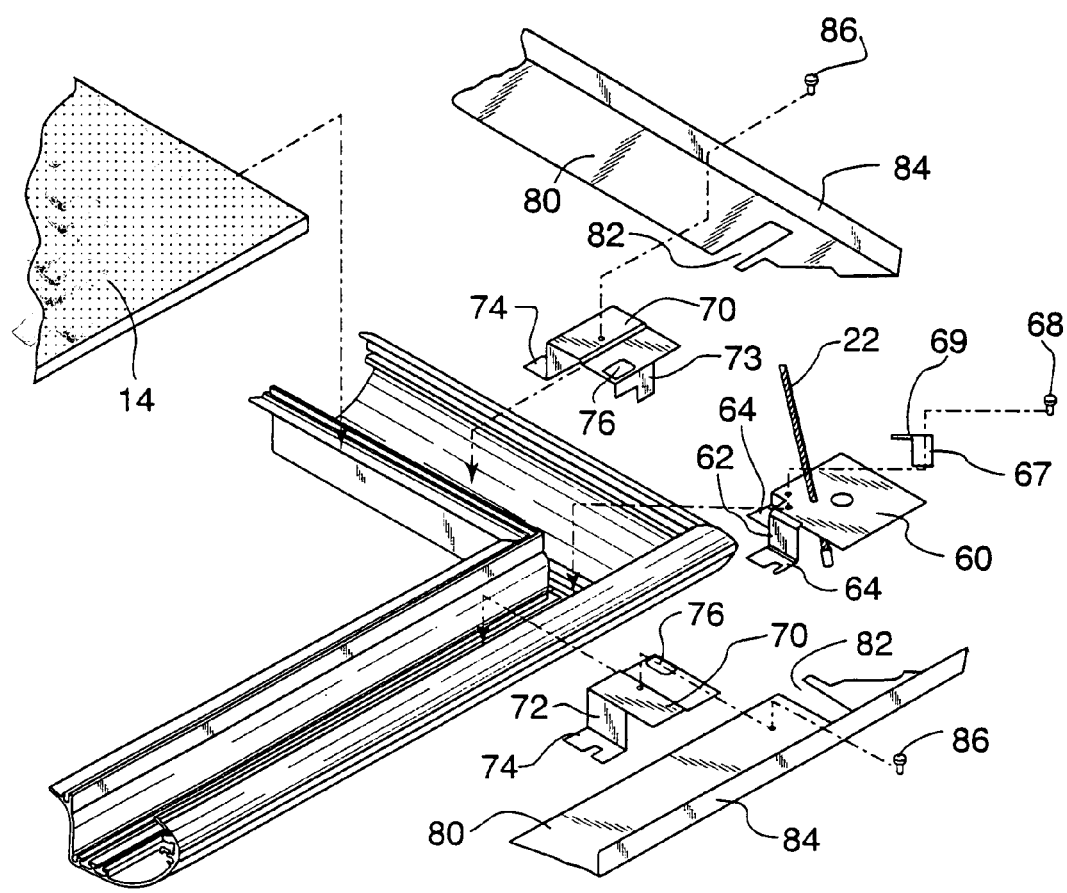
FIG. 4 is a perspective exploded view of the right corner portion illustrated in FIG. 2.
Figure 5:
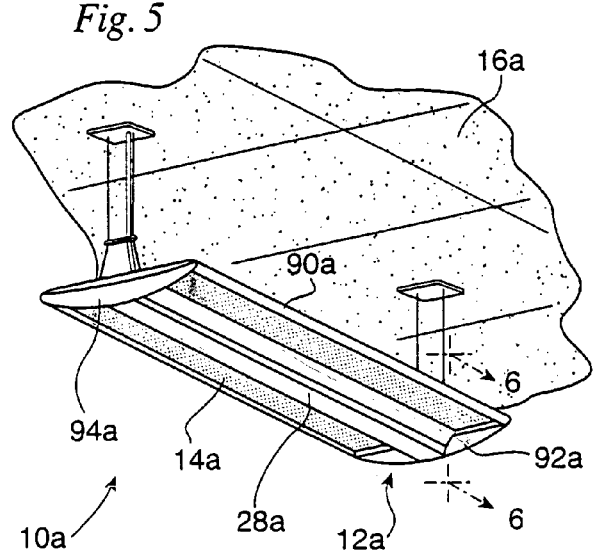
FIG. 5 is a perspective view of an alternate embodiment of the lighting assembly, wherein one edge of a panel is seated in a stringer and the opposite edge is retained in a lintel.

With reference now to FIG. 4, it will be seen that a generally square corner bracket 60 includes a pair of depending legs 62, only one of which is visible in FIG. 4.

The legs 62 terminate at a perpendicular slotted flange 64. A corner bracket 60 is fastened to intersecting stringers at each corner of the housing 12, with the shaft of a machine screw or bolt 52 extending within the slots of the flanges 64 and a mating nut bearing down upon the flange 64.

Figure 2:
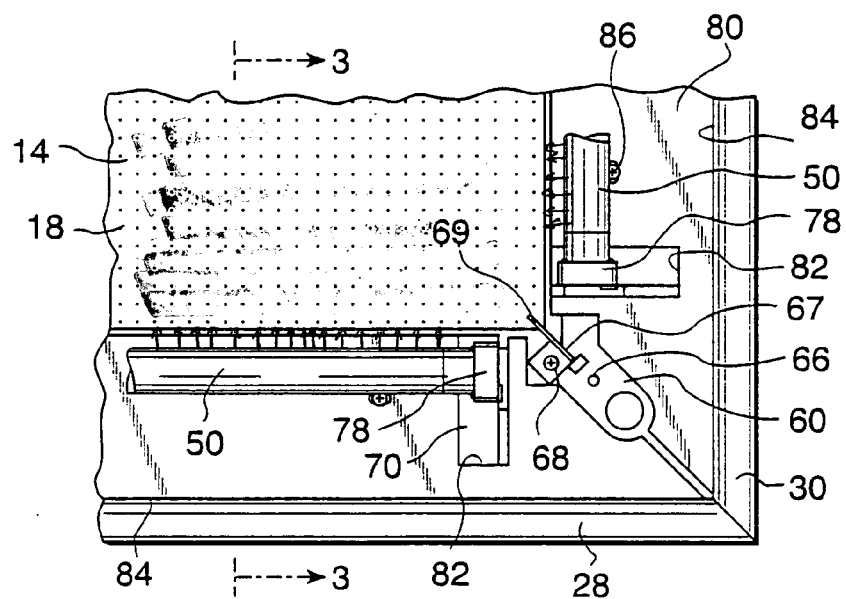
FIG. 2 is an enlarged scale fragmentary plan view of the proximal right corner of the lighting assembly (as viewed in FIG. 1) and showing a pair of perpendicular stringers as well as linear lighting elements and mounting hardware including sockets.

The corner bracket 60 includes an aperture 66 (FIG. 2) through which the support cable 22 is threaded, with an enlarged crimped end or cap of the cable 22 positioned beneath the corner bracket 60. The upper surface of the corner bracket 60 also receives a lighting panel hold down clip 67 which is secured by a screw 68 as illustrated in FIG. 2. A cantilever arm 69 of the hold down clip 67 overlies and abuts the upper face 18 of the lighting panel 14.

Additionally mounted within the stringers are socket brackets 70, having a generally planar stepped upper surface and a pair of depending legs 72, 73. The leg 72 includes a slotted perpendicular flange 74 for securement to the stringer, utilizing a bolt 54 carried in a channel 52.

The socket bracket 70 includes, on its upper surface, a socket aperture 76 within which is received an electrical socket 78 for mounting and energizing the lighting tube 50 as illustrated in FIGS. 2 and 3.

A horizontal reflector panel 80 is positioned beneath the lighting tube 50, with the socket 78 extending through a slot 82 formed in the panel 80. The reflector panel 80 includes a perpendicular side wall 84 which serves to reflect illumination from the lighting tube 50 toward the retained edge of the lighting panel 14, while the horizontal surface of the panel 80 serves to reflect illumination from the lighting tube 50 upwardly, toward the ceiling 16, supplementing the illumination emanating from the upper face 18 of the lighting panel 16.

It will be noted that the reflector panels 80 are secured within the stringers by screws 86 which extend through apertures in the reflector panels and engage apertures in the socket brackets 70.

Referring now to FIGS. 5 through 8, wherein an alternate embodiment of the invention is illustrated, like reference numerals will be employed to denote like components of the previous embodiment, however, bearing the suffix "a".

A multidirectional interior lighting assembly 10a includes a housing 12a which supports a pair of lighting panels 14a in a generally horizontal position beneath a room ceiling 16a. The lighting panel 14a may comprise a transparent acrylic panel identical to that of the lighting panel 14 of the previous embodiment, however, being dimensioned with a reduced width, such that a pair of panels 14a are supported in the housing 12a. Each of the panels 14a includes a upper face 18a and a lower face 20a.

It should be noted that the housing 12a is symmetrical about its longitudinal axis. Pursuant to the invention, the housing 12a is formed of a single extruded metal stringer 28a. The housing 12a additionally includes a pair of extruded lintels 90a, having a length equal to that of the stringer 28a, and a pair of end plates 92a, 94a.

Figure 6:
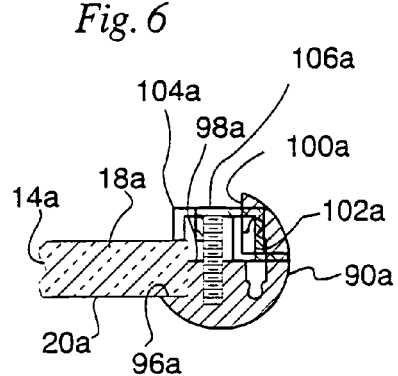
FIG. 6 is an enlarged scale fragmentary sectional view through the lighting assembly, the same being taken substantially along the plane 6—6 of FIG. 5 and showing details of the lintel and the manner in which an edge of the panel is retained therein by a channel iron.
Figure 7:
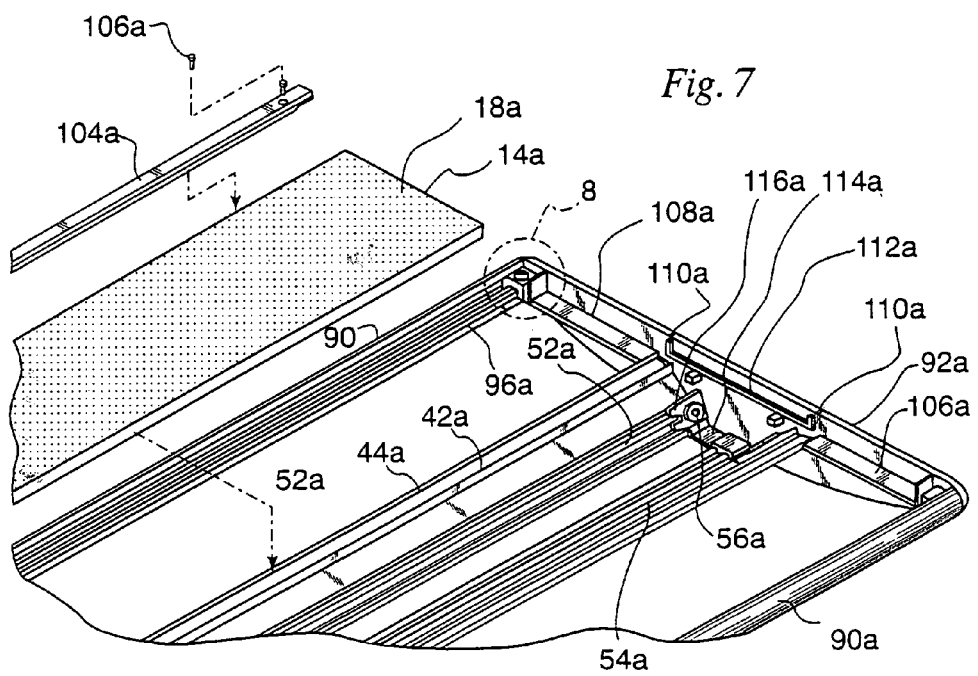
FIG. 7 is an enlarged scale exploded view of the lighting assembly illustrated in FIG. 5 showing details of an end plate which joins a stringer and a lintel.

Each lintel 90a includes a "L" shaped groove 96a within which the peripheral surface of the lower face 20a of the lighting panel 14a is seated, as shown in FIG. 6. The lintel 90a includes a further open topped channel having a horizontal bottom wall 98a and a vertical sidewall 100a, as well as a contiguous internal channel 102a. As illustrated in FIGS. 6 and 7, the panel 14a is captively retained in the lintel 90a with the peripheral surface of its lower face 20a and its peripheral edge surface in abutment against the L-shaped groove 96a. The panel 14a is captively retained in such position by a channel iron 104a which is held fast by a plurality of screws 106a. A lateral flange of the channel iron 104a is in abutment with a vertical wall of the internal channel 102a, as illustrated in FIG. 6.

The opposite parallel longitudinal edge of the panel 14a is seated in the stringer 28a in a manner substantially identical to that disclosed with reference to the previous embodiment, with the lower face 20a of the lighting panel being in contact with an L-shaped groove in a vertical flange 42a as well as at least one support rib 44a, however, hold down clips are not employed.

The stringer 28a and the two lintels 90a are unitarily secured to provide a rigid housing 12a, utilizing a pair of end plates 92a, 94a. Since the end plates 92a, 94a are mirror images of one another, reference hereinafter will be made only with respect to the end plate 92a illustrated in FIG. 7 and FIG. 8.

The end plate 92a comprises a generally planar panel having a substantially straight top edge, rounded corners conforming to the diameter of the lintels 90a and an arcuate lower edge. On the inner face of the panel 92a there is provided a pair of symmetrically positioned, generally horizontal support flanges 106a, 108a upon which the lower face 20a of the panel 14a is seated.

The assembly 10a is suspended from the ceiling 16a by suspension cables. Each suspension cable is threaded through a pair of apertures 110a in the top edge of the end plate and is looped within an open channel 112a on the inner face of the end plate.

Centrally projecting from the inner face of the end plate 92a is a securement bracket 114a, which includes inwardly projecting components configured to be received within channels 52a formed in the stringer 28a. Portions of the bracket 114a overlie the channels 52a and include notches 116a for securement to the stringer 28a utilizing bolts 54a and nuts 56a, as previously described with reference to the hardware components of the prior embodiment. With the bolts and nuts tightened, the stringer 28c is rigidly connected to the end plates 92a, 94a.

Figure 8:
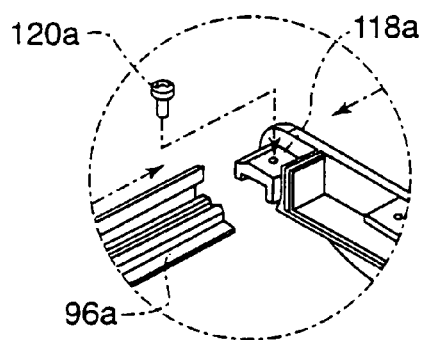
FIG. 8 is a partial enlarged exploded view showing details of FIG. 7 and more particularly, the manner in which the end of a lintel is joined to an end plate.

With reference now to the partial view of FIG. 8, a generally U-shaped inverted connecting link 118a projects from the inner face of the end plate 92a. The link 118a includes an upper web and a pair of depending channels legs. One of the legs is configured to be received within the internal channel 102a of the lintel and the other leg is configured to seat upon the horizontal wall of the L-shaped groove 96a. A machine screw extends through a threaded aperture in the web of the link 118a and bears down against the bottom wall 98a to rigidly connect the lintels 90a to the end plates 92a, 94a.

As with the prior embodiment, the stringer carries electrical wiring, ballasts, lighting tubes, electrical sockets and reflector assemblies which are not illustrated.

Figure 9:
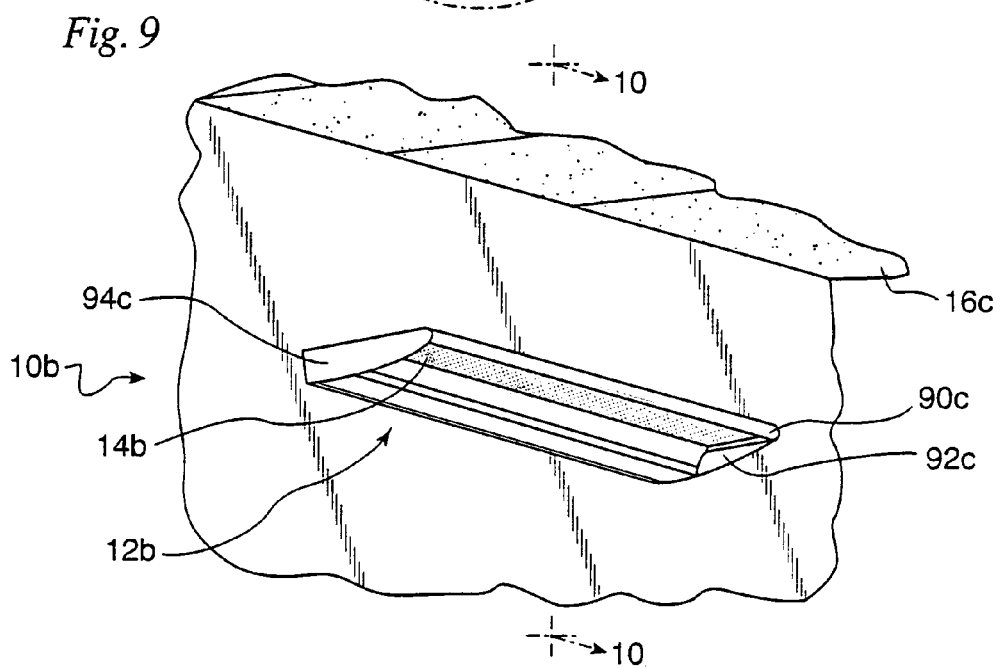
FIG. 9 is a perspective illustration of a further embodiment of the invention wherein the lighting assembly is wall mounted.
Figure 10:
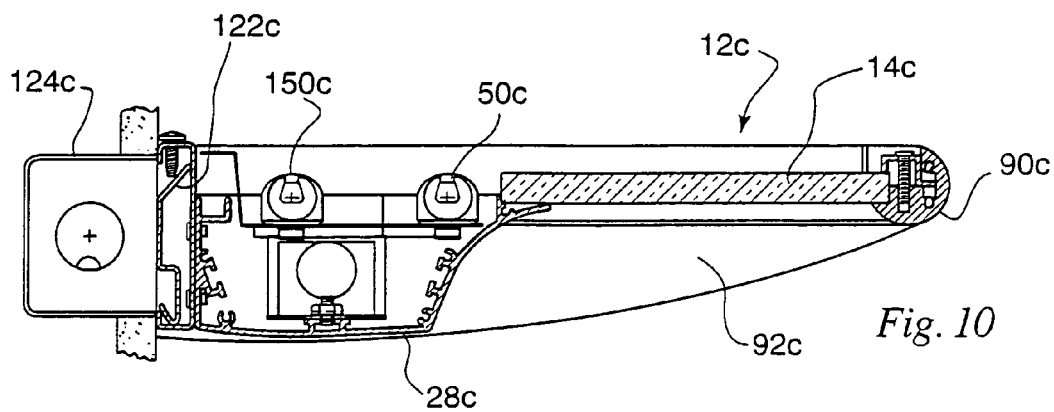
FIG. 10 is an enlarged scale sectional view through the lighting assembly illustrated in FIG. 9, the same being taken substantially along the plane 10—10 of FIG. 9.

In FIGS. 9 and 10 there is illustrated a further embodiment of the invention wherein a lighting assembly is mounted to a wall. With reference to the embodiment of FIGS. 9 and 10, like numerals will be employed to denote like components of the previous embodiments, however, bearing the suffix "b".

A multidirectional interior lighting assembly 10b includes a wall mounted housing 12b which supports a lighting panel 14b in a generally horizontal position beneath a ceiling 16b. In this embodiment, the housing 12b is similar in construction to the housing 12a previously described however, only a single lighting panel 14c is employed.

The housing 12c comprises a stringer 28c, a single lintel 90c and a pair of end plates 92c, 94c. The stringer and single lintel are secured to the end plates 92c, 94c in a manner identical to that disclosed with reference to the embodiment of FIGS. 5 through 8 and the lighting panel 14c is supported in the housing 12c in a manner substantially identical to that disclosed with reference to the embodiment of FIGS. 5 through 8.

The embodiment of FIGS. 9 and 10 differs, however, with respect to the stringer 28c. Unlike the stringer 28b, the stringer 28c supports only a single lighting panel 14c and includes a mounting bracket 122c for interconnecting the lighting assembly 10c to a wall mounted electrical conduit box 124c and for supporting the lighting assembly 10c from a wall surface.

In addition to a lighting tube 50c in registration with a panel edge, a supplemental lighting tube 150c is provided. The supplemental tube 150c projects illumination upon the surface of the supporting wall as well as upon the ceiling 16c.

It should be noted that the multidirectional transparent panel lighting system of the present invention provides diffused direct illumination emanating from the lower face of one or more horizontally positioned transparent lighting panels as well as providing indirect illumination, with the light being impinged upon ceiling, and, in some instances wall surfaces, directly from the lighting tubes, as well as from the upper face of the lighting panel.

It should also be noted that the multidirectional transparent panel lighting system of the present invention is well suited for the utilization of high efficiency low power consumption linear lighting tubes such as T5 linear tubes and compatible ballasts.

Preferably, the stringers and lintels are formed of extruded aluminum and the end plates are formed of die cast aluminum to provide a durable lighting fixture housing of high strength which is relatively light in weight.

Thus it will be seen that there is provided a multidirectional transparent panel lighting system which achieves the various aspects, features and considerations of the present invention and which is well adapted to meet the conditions of practical usage.

Since various possible embodiments might be made of the present invention and since various changes might be made in the exemplary embodiments shown herein without departing from the spirit of the invention, it should be understood that all matter herein described or shown in the accompanying drawings is to be interpreted as illustrative and not in a limiting sense.

What is claimed is:

1. In an interior room having a ceiling, a multidirectional lighting system for illuminating the room, the multidirectional lighting system comprising a housing, a planar transparent panel carried by the housing, the panel having an exposed upper face, an exposed lower face and a pair of parallel edges the housing including a pair of parallel stringers, each stringer comprising an extruded metal member, each stringer including an integral rib in engagement with the lower face of the panel and a vertical flange adjacent each of the parallel edges, an illumination source carried by each stringer, each illumination source being in registry with one of the parallel edges, at least one of the faces including an array of dots, each vertical flange engaging one of the parallel edges only adjacent the lower face, whereby an unobstructed path for direct illumination of each edge from each illumination source is provided, the housing being positioned within the room beneath the ceiling with the panel substantially horizontal, illumination emanating from the panel being dispersed downwardly from the lower face of the panel and upwardly toward the ceiling from the upper face of the panel.

2. A multidirectional lighting system as constructed in accordance with claim 1 wherein both faces of the panel include an array of dots, whereby increased illumination emanates.

3. A multidirectional lighting system as constructed in accordance with claim 1 wherein the panel is rectangular and the housing comprises a rectangular array of stringers rigidly interconnected to one another.

4. A multidirectional lighting system as constructed in accordance with claim 1 wherein each stringer includes at least one channel, the lighting system further including components carried in each stringer and secured to the channel.

5. A multidirectional lighting system as constructed in accordance with claim 1 wherein the lighting system is suspended from the ceiling.

6. A multidirectional lighting system as constructed in accordance with claim 1 wherein illumination emanating from the illumination source is dispersed upwardly toward the ceiling directly from the illumination source.

7. A multidirectional lighting system as constructed in accordance with claim 1 wherein the illumination source comprises a linear tube.

8. A multidirectional lighting system as constructed in accordance with claim 1 wherein the transparent panel is formed of acrylic.

9. A multidirectional lighting system as constructed in accordance with claim 1 wherein each stringer includes a pair of ribs in engagement with the lower face of the panel, whereby light leakage from the illumination source is precluded.

10. A multidirectional lighting system as constructed in accordance with claim 1 wherein the vertical flange and the rib are configured as an L-shaped groove, the peripheral surface of the lower face being seated in the groove.

11. In an interior room having a ceiling, a multidirectional lighting system for illuminating the room, the multidirectional lighting system comprising a housing, a planar transparent panel carried by the housing, the panel having an upper face, a lower face and a plurality of edges, the housing including a stringer, at least one edge of the panel being seated in the stringer, an illumination source carried by the stringer, the illumination source being in registry with the one edge of the panel, the housing being positioned within the room beneath the ceiling with the panel substantially horizontal, illumination emanating from the panel being dispersed downwardly from the lower face of the panel and upwardly toward the ceiling from the upper face of the panel, the housing further including a lintel, another edge of the panel being seated in the lintel, the housing further including an end plate, the end plate joining an end of the lintel to an end of the stringer.

12. A multidirectional lighting system as constructed in accordance with claim 11 wherein the panel is rectangular, the stringer and the lintel being parallel to each other.

13. A multidirectional lighting system as constructed in accordance with claim 11 wherein the room includes at least one wall, the housing being secured to the one wall.

14. A multidirectional lighting system as constructed in accordance with claim 11 wherein the upper face and the lower face of the panel include an array of dots, whereby increased illumination emanates from the panel faces.

15. A multidirectional lighting system as constructed in accordance with claim 11 wherein illumination emanating from the illumination source is disbursed upwardly toward the ceiling directly from the illumination source.

16. A method of illuminating an interior room having a ceiling with a transparent panel, the method comprising the steps of:
   a) positioning the transparent panel within a groove formed in a housing by engaging a peripheral portion of a lower face of the panel in the groove and engaging an edge of the panel only adjacent the lower face,
   b) positioning the housing within the room and beneath the ceiling in a horizontal orientation,
   c) positioning an illumination source within the housing adjacent the groove and in registry with the edge of the panel,
   d) transmitting illumination directly from the illumination source through the edge of the panel by energizing the illumination source,
   e) projecting illumination downwardly into the room from the a lower face of the panel, and
   f) projecting illumination upwardly toward the ceiling from an upper face of the panel and directly from the illumination source,
   whereby illumination projected upwardly upon the ceiling is dispersed throughout the room as indirect illumination.

17. A multidirectional lighting system for interior room illumination, the lighting system comprising a housing, a transparent panel, the panel having an exposed upper face and an exposed lower face, the panel being carried by the housing, the housing comprising at least one stringer, a peripheral portion of the lower face of the panel adjacent an edge of the panel being seated in a groove formed in the stringer, the groove engaging the edge of the panel only adjacent the lower farce, the stringer carrying an illumination source in registry with the edge of the panel, the groove providing an unobstructed path for direct illumination from the illumination source to the edge, the housing including a clamp, the clamp being in engagement with the panel for preventing inadvertent disengagement of the panel from the housing, illumination emanating from the illumination source being directly transmitted to the panel edge and into the panel and being dispersed downwardly from the exposed lower face of the panel and upwardly from the exposed upper face of the panel.

18. A multidirectional lighting system as constructed in accordance with claim 17 wherein the upper face and the lower face of the panel include an array of dots, whereby increased illumination emanates from the panel faces.

19. A multidirectional lighting system as constructed in accordance with claim 17 wherein the clamp comprises a clip having a cantilever arm, the cantilever arm overlying a face of the panel.

20. A multidirectional lighting system as constructed in accordance with claim 17 wherein the clamp comprises a channel iron which engages the panel.

* * * * *